T. Fisler,
Feed Bag.
Nº 34,715.    Patented Mar. 18, 1862.
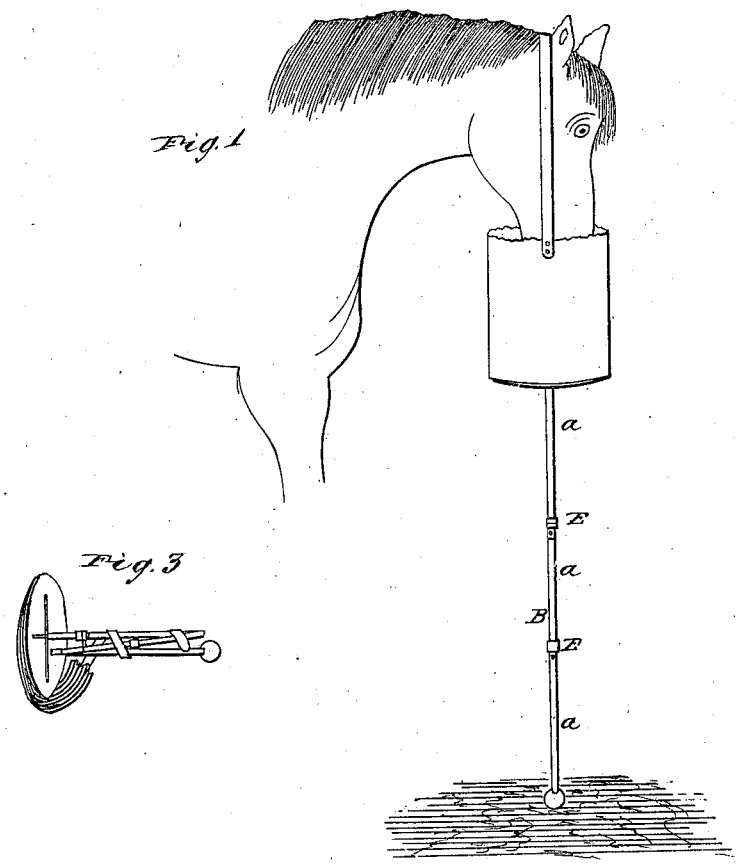
Witnesses
Geo. L. Witzel
S. H. Quint
Inventor
Thomas Fisler

UNITED STATES PATENT OFFICE.

THOMAS FISLER, OF CAMDEN, NEW JERSEY, ASSIGNOR TO J. P. REED, OF PHILADELPHIA, PENNSYLVANIA.

IMPROVEMENT IN FEED-BAGS.

Specification forming part of Letters Patent No. 34,715, dated March 18, 1862.

*To all whom it may concern:*

Be it known that I, THOMAS FISLER, of the city of Camden, in the county of Camden and State of New Jersey, have invented a new and useful Improvement in Feed-Bags for Feeding Horses or other Animals; and I do hereby declare that the following is a full, clear, and exact description of the construction and operation of the same, reference being had to the annexed drawings, making a part of this specification, in which—

Figure 1 represents a view of said bag when in use, and Fig. 2 the same with the rod folded up. Fig. 3 represents a view of the bag when folded and rolled up ready for transportation.

The nature of my invention consists in the arrangement or connecting together of a number of rods $a\ a\ a$ by means of rivets so arranged that when opened out they form a continuous rod B, held firmly in position by means of slides $e\ e$, which drop over the ends of the connecting-rods at each joint. One end of the rod is attached to the bag, and the opposite end rests on the ground by which the bag is supported, so that the animal can take up its food the same as when feeding out of a permanent manger, the bag being held in place by a strap passing over the animal's head, the whole being arranged and operated as seen in Fig. 1. When not in use, the rod is folded together and held in place by a ring D, which drops over the end of the rods, as seen in Fig. 2. When ready for transportation, it is rolled up, as seen in Fig. 3, the whole forming a cheap and convenient arrangement for feeding horses or other animals, and light of transportation.

Having thus fully described my improved feed-bag and pointed out its utility, what I claim as new therein of my invention, and desire to secure by Letters Patent, is—

The connecting and folding rod attached to the bag or its equivalent, and arranged as herein set forth, and for the purpose specified.

THOMAS FISLER.

Witnesses:
GEO. L. WITSIL,
S. H. QUINT.